United States Patent [19]
Waters

[11] Patent Number: 5,920,862
[45] Date of Patent: Jul. 6, 1999

[54] BEACONS FOR LOCALES

[75] Inventor: Richard C. Waters, Concord, Mass.

[73] Assignee: Misubishi Electric Information Technology Center America, Inc. (ITA), Cambridge, Mass.

[21] Appl. No.: 08/556,227

[22] Filed: Nov. 9, 1995

[51] Int. Cl.$^6$ ................................................ G06F 17/00
[52] U.S. Cl. ........................... 707/10; 707/104; 707/531; 707/532
[58] Field of Search ............................... 707/1–206, 100, 707/104, 500–542

[56] References Cited

U.S. PATENT DOCUMENTS

| | | | |
|---|---|---|---|
| 5,212,778 | 5/1993 | Dally et al. | 395/400 |
| 5,490,252 | 2/1996 | Marcera et al. | 395/200.01 |
| 5,621,660 | 4/1997 | Chaddha et al. | 395/200.77 |
| 5,661,469 | 8/1997 | Mies et al. | 340/825.53 |

*Primary Examiner*—Wayne Amsbury
*Assistant Examiner*—David Yiuk Jung
*Attorney, Agent, or Firm*—Dirk Brinkman

[57] ABSTRACT

In a multicast environment in which large-scale virtual environments are built using locales and in which data from non-neighboring locales is ignored to minimize computation and local storage, a system is provided to find or track objects and their associated locales for locales to which a user is not listening by assigning the object a beacon and broadcasting the beacon in a subspace channel, with the beacon having the multicast address of the locale in which the sought-after object resides, thus to permit an upload of data from the particular locale. Beacons are doled out parsimoniously to objects one wants to find and objects one wants other people to find to minimize processing and data storage requirements. Ignored locales are thus located using a beacon broadcast in a subspace channel which in addition to broadcasting messages about itself to the locale it is in, also broadcasts messages into a subspace channel to others about itself and the multicast address of the locale it is in. In one embodiment, subspace channel information permits accessing non-neighboring locales which would normally be ignored due to the fact that they are not neighboring. Thus the beacon system permits keeping track of all objects possessing a beacon regardless of the locales in which they reside and regardless of whether or not the locales in which they reside are being accessed, such that objects are not lost due to the ignoring of locales by the multicasting system.

7 Claims, 5 Drawing Sheets

BEACONS FOR LOCALES

FIELD OF INVENTION

This invention relates to the management of shared multi-user virtual environments utilizing locales and more particularly to a beacon system for locating ignored locales in a multicasting system in which non-neighboring locales are ignored to limit processing and storage requirements.

BACKGROUND OF THE INVENTION

During the creation of a virtual environment, and as described in U.S. patent application Ser. No. 08/520,099 now U.S. Pat. No. 5,736,990 by John W. Barrus and Richard C. Waters filed on Aug. 28, 1995 and assigned to the assignee hereof, and incorporated herein by reference, virtual or simulated environments may be created through the utilization of so-called locales. Each of the locales defines a region of the virtual environment in terms of a perimeter and its own local origin. A locale is defined as a geometric area in which the distance between discrete representable positions at the limits of that area are small enough to be considered insignificant. Thus the locales have the characteristic that they are defined by a boundary and that they have their own individual origins such that all graphical objects within a locale are located with respect to the particular origin. This permits the creation of a virtual environment by a number of individual designers, each having independent control of the locales he is responsible for. Having created a virtual environment in this manner, it is possible to utilize the locales concept to manage control of the environment when the environment is exercised by multiple users.

A locale is a self contained subdivision of a part of a virtual environment each with its own model and each with its own boundary and its own origin. This permits graphical objects within a locale to be accurately located with respect to this local origin and also permits management of neighboring models merely through the specification of an agreed upon distance between the respective locale origins and locale orientations.

When a network is utilized, the data from each of the locales is multicast onto the network so that data relating to graphical objects in the locale as well as the background or terrain is available to every user. If there are many locales, a very large number of messages are sent over the network. This can tax the carrying capacity of the network, but long before the network becomes overloaded, the large number of messages can swamp the ability of any one user at a network node to receive and process them.

In order to solve this problem, each locale is assigned a separate multicast address so that individual nodes need not listen to every message, but rather only to the messages associated with the subset of locales that are relevant to the processing at the node. In particular, if the point of view of a node is in a given locale, then the node is configured so that it only receives messages relating to that one locale and its immediate neighbors with the node ignoring the messages from all other locales.

The importance of having a node ignore much of the data in a virtual environment is that it greatly reduces the computation required at any given node. However, it introduces a problem. The fact that information is being ignored means that there are some objects that a given node knows nothing about. In particular, it does not know what locales these objects are in. Therefore, it does not know what multicast address to listen to in order to find out about these objects. In short, if a node does not know about a given object, there is no way for it to ever find out anything about it. This means that as a practical matter, one cannot ignore anything unless some means is provided for finding the ignored objects again later.

The severity of the problem posed by large virtual environments from a computation and storage point of view can be seen by the following example. Assume that one wishes to simulate a building having 50 rooms, each corresponding to a different locale. Assume that on average each room, and therefore locale, contains 50 objects. Assume that graphical images are being generated at 30 frames per second. Assume that some of the objects are moving and require many messages per second to describe their frame-by-frame positions, while most objects are standing still and require only one message every few seconds to describe them. Finally, assume that this results in 1 message per second per object on average. This means there are 50 messages per second per room, and 2,500 messages per second for the building as a whole. If one was modeling a virtual city with 100 such buildings a total of 250,000 messages per second would be required.

Consider what the above example implies from the point of view of network bandwidth, processing power at a processing node, and memory requirements at a processing node. Assume that on average 100 bytes are required to represent a message, 0.0001 second is required to process a message, and 10,000 bytes are required to represent all the features of an object in memory. This implies that for a single room, 5000 bytes per second are transmitted, easily within the capabilities of almost any network, 0.005 seconds are required to process the messages, a very minor load on the processor, and 500,000 bytes of storage are required in the processing node, again a small load by today's standards. However, for the building as a whole, 250,000 bytes per second are transmitted, taxing but still within the capabilities of most current networks. Fully 0.25 seconds per second are required for processing messages, an unreasonable load given that the node as a great deal of other processing to do. Further, 25,000,000 bytes of storage are required for objects, beyond the capabilities of many of today's machines. Lastly, consider that for a virtual city of 100 such buildings, 25,000,000 bytes per second are transmitted, possible with high speed networks of various kinds. Also, 25 seconds per second are required to process messages, which makes real time performance impossible. Finally, 2,500,000,000 bytes of storage are required, which is equally impractical.

The key to avoiding the costs above is to realize that a person participating in a virtual meeting in a room does not need to know about anything except what is happening in that room and perhaps a few adjacent rooms. He certainly does not need to know anything about what is happening in rooms on other floors. This means that no matter how large the virtual building or city, the processing node being used by this person only needs to process a few hundred messages at most, if it ignores the messages from the rooms it does not care about, that is to say ignores the messages associated with rooms that do not neighbor the room the person is in. In order to do this in a multicast environment, one may merely exclude data having addresses relating to non-neighboring locales. By non-neighboring is meant non-contiguous.

The truncation of information described above allows the processing and memory requirements placed on the processing node to be small. However, it brings up a problem. Were one to try to locate the janitor, and assuming the janitor was in the basement and not near the room to be serviced, one could not provide a virtual rendition of the janitor since the address of the locale he is in is not known. A related problem is that it is even difficult to follow an object as it moves from one locale to another. If it moves slowly enough, one can relatively easily keep track of than object as it moves from one locale to a neighboring locale, however, it is possible that the object may be quickly jumped from one locale to a non-neighboring locale. In this case, one can loose track of the object. In both situations, what is necessary is a system for finding objects in non-neighboring locales, and to do so in such a manner that neither, network bandwidth, processing requirements, nor memory requirements are significantly increased.

SUMMARY OF THE INVENTION

In the subject invention, a system is designed to address the problem engendered by sending all the messages about objects in a virtual world via the multicast addresses of locales the are in. The problem is, how is a process to find out anything about an object, for example, what locale it is in, unless it already knows what locale it is in? The solution to this problem is to introduce a special class of objects called beacons that can be located without knowing what locale they are in.

Consider the following example of why beacons are needed and how they are used. Suppose that you have met another person in a virtual world and he asks you to follow him so that he can show you around. An easy way to follow is to attach the point of view or POV controlling what you see to his representation in the virtual world as a subobject. Your POV will then go wherever he goes and see whatever he sees.

However, what happens if he transfers to another locale? If your process is already connected to the address of the new locale, then there is no problem, your POV remains a subobject of his representation and implicitly moves to the new locale. However, if he moves to a locale your process is not connected to, you stop receiving any information about him. In particular, he disappears from view and your POV is left dangling in no particular locale. You have lost him with no way to find him again.

As discussed below, in this subject invention, facilities are provided that make it possible to find a beacon no matter where the associated object goes. If someone wants to make it possible for you to reliably follow him, then he has to include a beacon in his representation in the virtual world. In the subject invention, a function is provided that an application can use to request that perpetual contact be maintained with a particular beacon.

In one embodiment, a beacon has two key fields: a tag that is an identifier specified by the creator of the beacon and the multicast address of the locale containing the beacon. The key feature of a beacon is that in addition to broadcasting messages about itself to the address associated with the locale it is in, it broadcasts messages about itself to a special beacon multicast address. To ensure that this mechanism is scalable to very large virtual environments, an unbounded number of potential beacon multicast addresses are provided. Which address to use is determined by using a hashing scheme on a beacon's tag, that is to say by using a many-to-one mapping from beacon tags to multicast addresses.

By default, the system does not connect to any beacon multicast addresses. A function 'listen-for-beacons' is provided whereby an application can request that the system listen to the beacon multicast address corresponding to a particular tag. Once the system is connected to a beacon multicast address, it maintains information about all the beacons sending messages to that address. If an application finds a beacon of interest, it can then request that the system connect to the multicast address of the locale containing the beacon using a function 'listen-to-beacon-locale'.

If one constructs something one wants other people to be able to follow, one must put a beacon high in the structure. For example one might make a virtual tour bus to carry people around in a virtual world and put a beacon on it. Conversely if one makes something that does not contain any beacons, then people will not be able to reliably follow it.

Another problem solved by the beacon system is the difficulty of finding objects owned by other people in the first place. If a designer designs something he wants other people to be able to find, he must put a beacon on it. Once this is done, then anyone who knows the tag of the beacon can find it by using the operation listen-for-beacons to listen to the beacon multicast channel that the beacon is broadcasting into.

The only complexity involved with beacons revolves around the ways tags are communicated between users. Suppose that a user U creates a beacon with a tag T and that another user V is interested in finding this beacon. In order for V to find the beacon, V must know T. There are three ways in which this can happen.

First, V may have previously come across the beacon for some other reason and remembered T. This corresponds to the situation in the example described hereinbefore. Second, U might communicate T to V in some way. For instance, U might send V a message describing some interesting location and give him the name T as a reference. V could then find the location by looking for a beacon tagged with T. Third, V might communicate a T to U in some way. For instance, V might advertise some service under the name T. V would then look for beacons with the tag T that act as requests for service.

In summary, in a multicast environment in which large-scale virtual environments are built using locales and in which data from non-neighboring locales is ignored to minimize computation and local storage, a system is provided to find or keep track of objects and their associated locales for locales to which a user is not listening by attaching a beacon to the object and broadcasting the beacon in a special beacon multicast channel, with the beacon containing an identifying tag and the multicast address of the locale in which the sought-after object resides, thus to permit an upload of data from the particular locale. Beacons are doled out parsimoniously to objects one wants to find and objects one wants other people to find to minimize processing and data storage requirements. Ignored locales are located using a beacon that in addition to broadcasting messages about itself to the address of the locale it is in, also broadcasts messages into a special beacon multicast channel. In one embodiment, subspace channel information permits accessing non-neighboring locales which would normally be ignored due to the fact that they are not neighboring. Thus the beacon system permits keeping track of all objects possessing a beacon regardless of the locales in which they reside and regardless of whether or not the locales in which they reside are being accessed, such that objects are not lost due to the ignoring of locales by the multicasting system.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
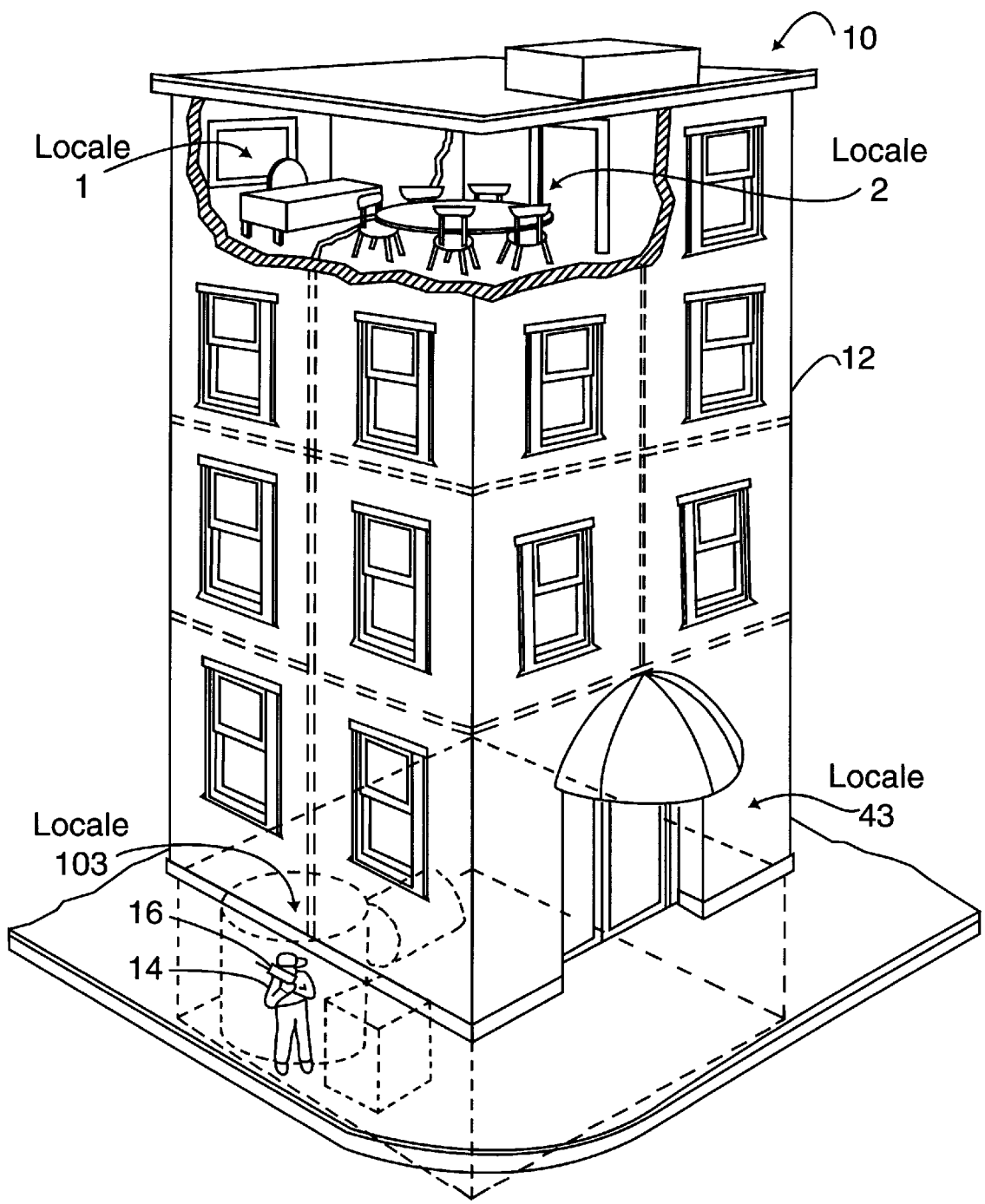
FIG. 1 is a diagrammatic representation of a virtual scene having locales in which the location of an individual constituting a janitor is desired in order to reconstruct a virtual scene at a location different from the present location of the janitor, with the janitor having a beacon attached to him for location purposes.

Referring now to FIG. 1, a virtual environment 10 is depicted in which a building 12 is subdivided into locales with locales 1, 2, 43 and 103 referring respectively to an office, a conference room, the entrance to the building, and the boiler room. It is important, for instance, to be able in a virtual reality representation to move an object from one locale to another locale to be able to provide a graphics rendering of the graphical object in the desired locale. As will be appreciated, locales are provided as a tool in a virtual reality scene to permit the placement and movement of graphical objects within a given locale so that an application that is only concerned with what is happening in a small part of the virtual building 12 can effectively ignore what is happening in the rest of the building thereby greatly reducing computation and local storage requirements.

As described in the aforementioned patent application, it is possible to reduce the amount of computation and local storage required by any terminal/application interacting with the virtual environment by associating each locale, or group of locales, with a different multicast address and having a given terminal/application only connect to and thus listen to the multicast channels associated with the locales it is interested in. In general, each locale is assigned a multicast address which corresponds to a given communication channel. Thus, locales and the objects therein can be accessed thru the multicast address associated with the locale. In the afformentioned patent application, data and other information from a large of number of locales was filtered in the sense of ignore data associated with uninteresting locales merely by not connecting to the corresponding channels. The result, as mentioned above, is the inability to find certain objects when the locale they are in is unknown.

Assuming that one wishes to ignore information concerning locales that are distant from the locales of current interest, then the problem naturally arises that graphical objects in ignored locales cannot be located unless one knows what locale to listen to. This problem in graphically illustrated in FIG. 1 in that assuming there is a janitorial problem to be addressed in locale 1, someone who is only listening to locales 1 and 2 has no way of knowing where, for instance, a janitor 14 is located. In attempting to call up a virtual reality scenario requiring the janitor, an application in locale 1 would need to have information about all of the locales in the building, which is impractical due to computation and storage requirements associated with listening to and recording all the information broadcast about all these locales.

In the subject system, each object of interest is provided with a beacon 16 which specifies the locale that the object is in and broadcasts this information over specialized beacon channel 20 as will be described in connection with FIG. 2.

Figure 2:
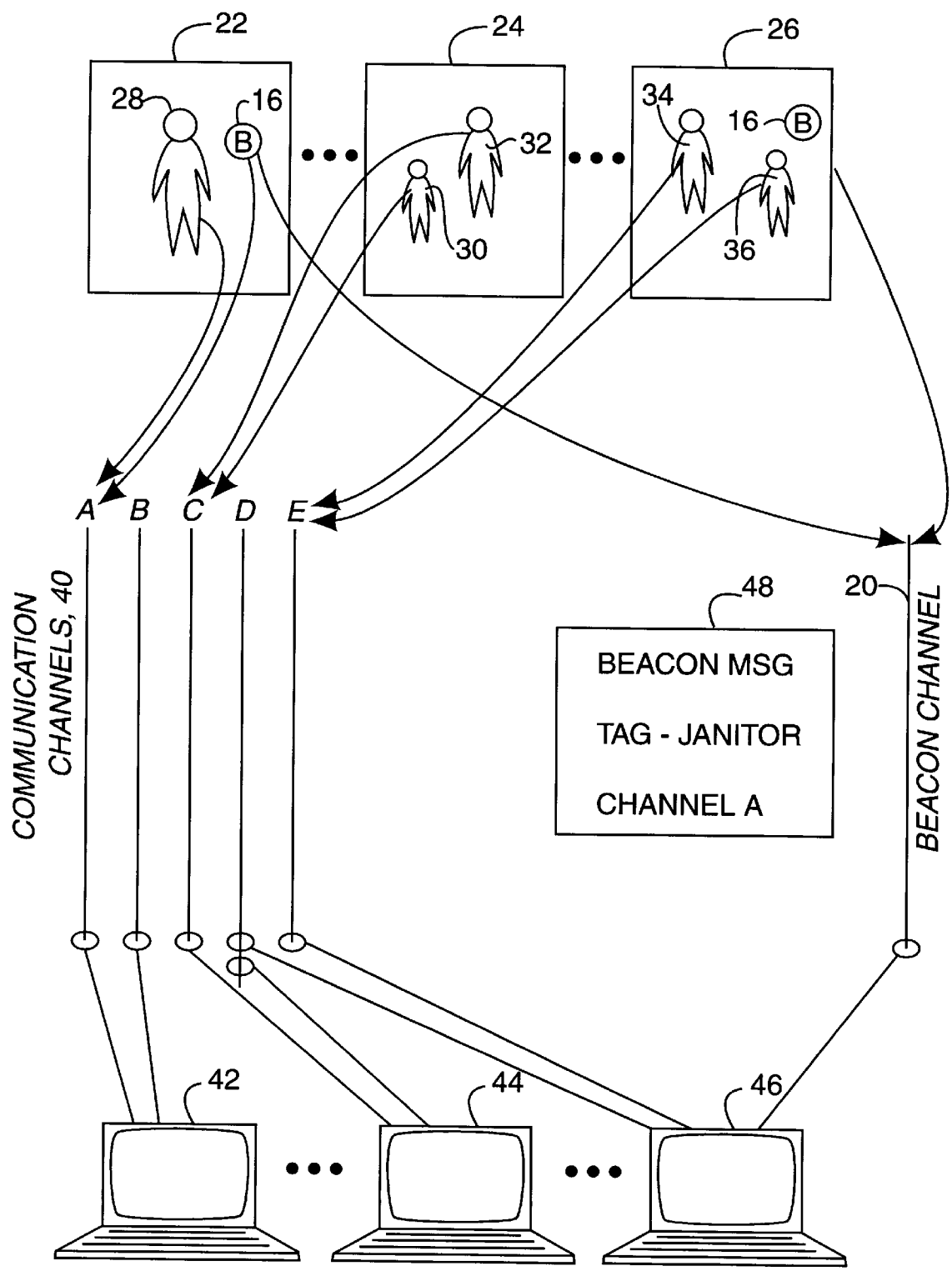
FIG. 2 is a diagrammatic representation of a networked virtual reality system in which many applications running on many network terminals share information pertaining to a number of locales and in which individuals to be depicted in the virtual reality scene are provided with beacons indicating the locale in which they are presently situated through broadcasting the beacon in a special beacon channel to all terminals.

Referring now to FIG. 2, a system is shown in which a number of locales 22, 24, and 26 have objects 28, 30, 32, 34, and 36 associated therewith. As can be seen, object 28 is an individual in locale 22, which is provided with a beacon. Individuals 30, 32, and 34 are not of sufficient interest to be provided with beacons, whereas individual 36 is provided with an appropriate beacon. Each locale is associated with a separate communication channel, in a group of channels here illustrated by reference character 40. Thus for instance, all information from locale 22 is broadcast on communication channel A. It will be appreciated that this information includes all the information necessary to reconstruct the virtual reality scene in this locale at terminal 42, 44, or 46 coupled to the network. In one configuration, terminal 42 is listening only to channels A and B, whereas terminals 44 and 46 are listening respectively to channels C and D, and channels D and E. The fact that each terminal is only listening to a few channels instead of all of them greatly reduces the computation and local storage required at the terminal.

However, in order for terminal 46 to reconstruct images associated with object 28 in locale 22, it is necessary for it to determine that information about object 28 being transmitted on channel A and then start listening to channel A. This is done using beacons in which an individual beacon message 48 includes a tag and a channel identifier specifying what channel to listen to for information about the associated object. In one embodiment, the format for the beacon message is as follows: <Janitor, 127.144.23.01>. This corresponds to a tag identifying the object associated with the beacon and an internet address identifying the channel and thus the locale in which information about the associated object resides.

Figure 3A:
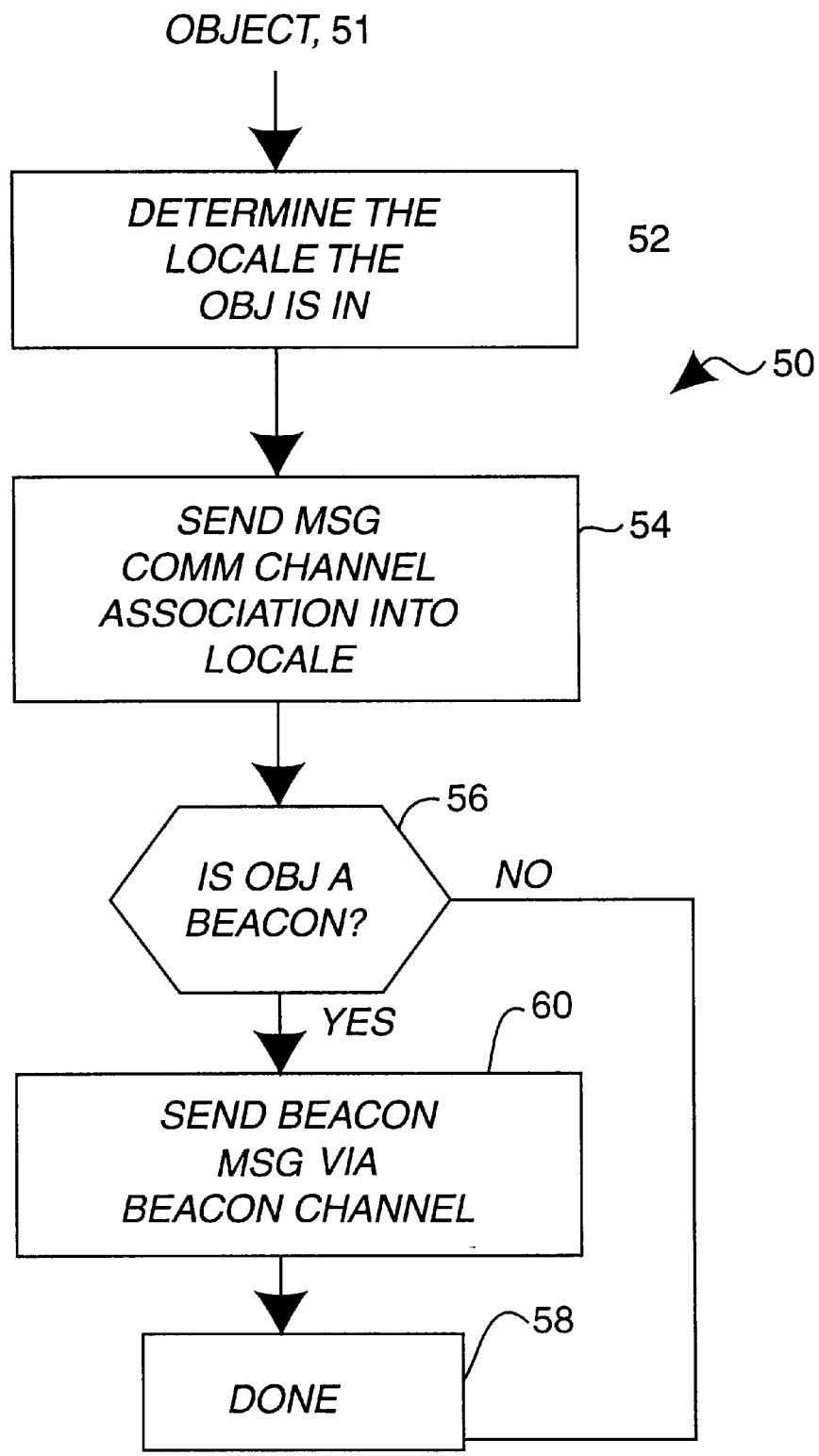
FIG. 3A is a flow chart showing how information is broadcast with regard to an object.

Referring now to FIG. 3A, a flow chart 50 is shown in which the subject system determines what channel or channels on which to broadcast information about a given object 51. In so doing, the system determines the locale the object is in as illustrated at block 52 and then sends a message to the communication channel associated with the locale as illustrated by block 54. A decision block 56 then checks to see whether the object has a beacon. If not no further action is taken as indicated by block 58. If the object does have a beacon then the system transmits a beacon message via the special beacon channel as illustrated by block 60. This task is accomplished through the subroutine listed below written in ANSI C.

```
void sendMessagesFor(spId id) {
    int2 locale = localeOf(id);
    if (locale != NOLOCALE) {
        sendMessage(id, communicationChannelFor[locale]);
    }
    if (subclass(getClass(id), spcBeacon)) {
        sendMessage(id, beaconChannel);
    }
}
```

Figure 3B:
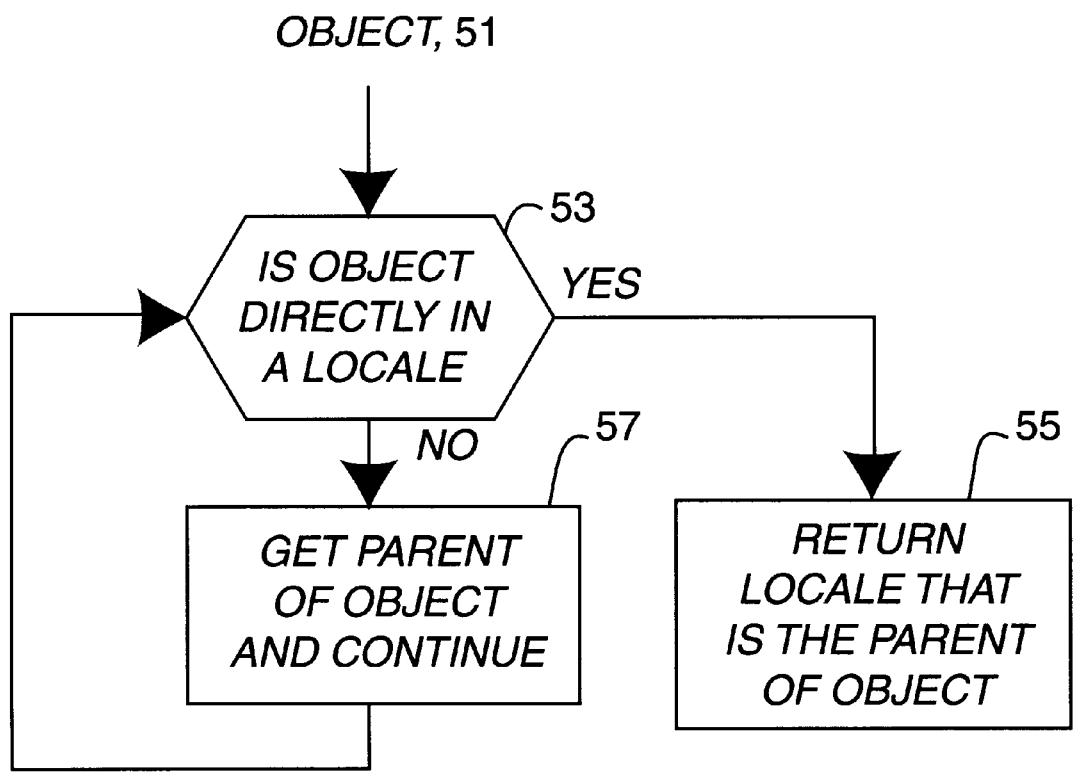
FIG. 3B is a flow chart showing how to determine the locale an object is in by searching through the chain of the parent, the grandparent, the great grandparent, and so on of the object until the containing locale is detected; and, FIG. 4 is a flow chart showing how an application uses beacons to locate an object of interest.

As illustrated in FIG. 3B, a subroutine is utilized to determine the locale an object 51 is in by looking to see whether the object is directly in a locale, as illustrated by decision block 53. Every object has a parent field that points to the object that directly contains it. If the parent of an object is a locale, then the object is said to be directly in the locale. If the object is directly in a locale, then this locale is returned as the locale the object is in, as illustrated at 55. Otherwise, as illustrated at 57, the process continues recursively starting from the parent of the object to determine the locale the parent is in. It may be necessary to search through a long chain of ancestors to determine ultimately the locale of the original object 51. It is possible that ultimately one may encounter an ancestor of the object that does not itself have any parent. If so, the object 51 is deemed to not be in any locale, and no messages are sent out about it. A subroutine implementing this process is listed below, again written in ANSI C.

```
spId localeOf(spId id) {
  spId p;
  for (p=id; p; p=getParent(p)) {
    if (subclass(getclass(p), spcLocaleLink)) return p;
  }
  return NULL;
}
```

Figure 4:
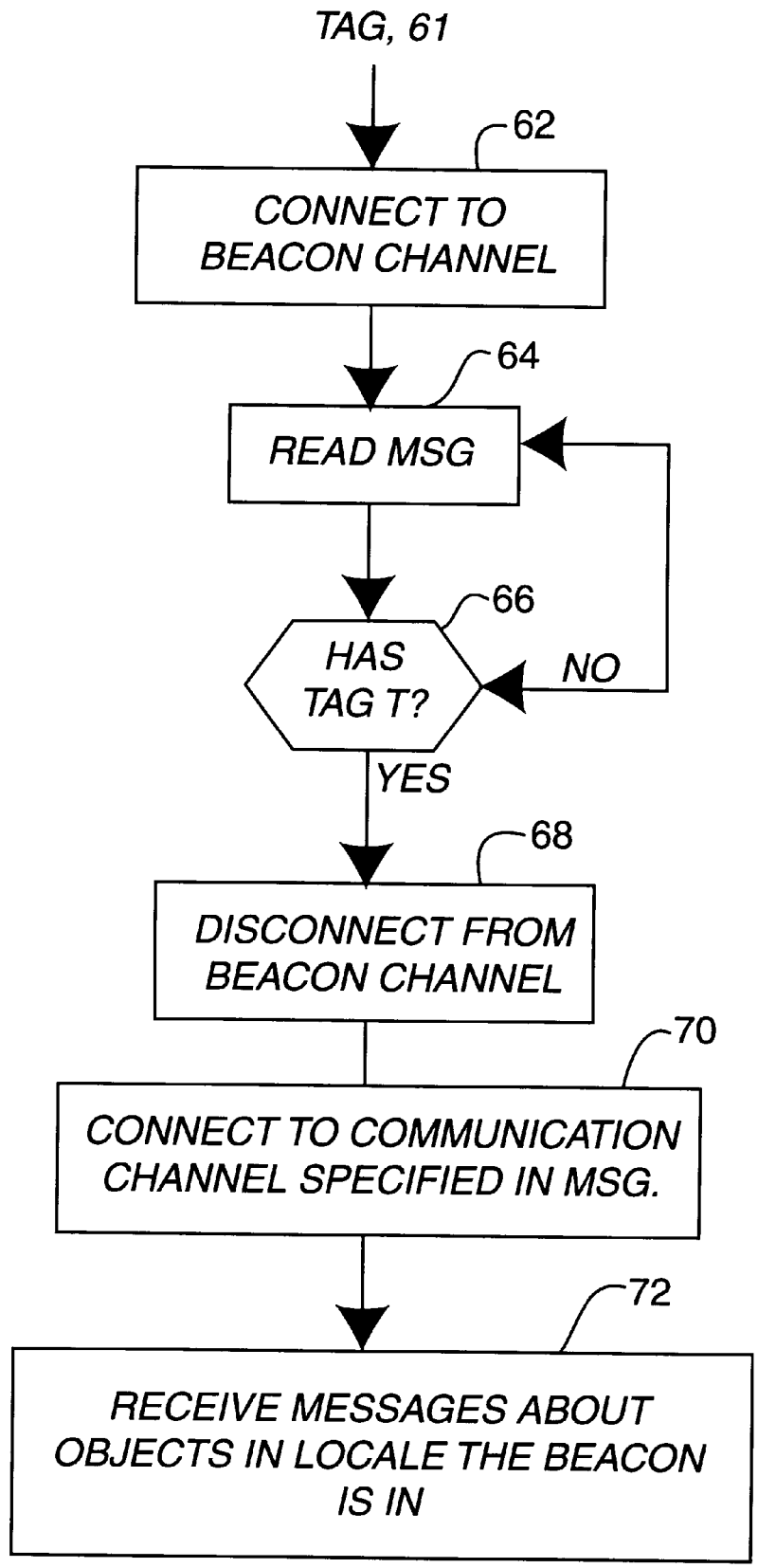

Referring now to FIG. 4, from the point of view of a terminal and the application running thereon, this flowchart shows how the terminal/application uses beacons in order to locate information about an object that is associated with a beacon that has a particular tag T 61. In so doing, the terminal/application first connects and starts listening to the special beacon channel as illustrated by block 62. The terminal/application then reads all the beacon messages coming over the beacon channel as illustrated at 64, with block 66 determining if there is a beacon message with tag T. If so, as illustrated at block 68, the terminal/application stops listening to the beacon channel and stops processing beacon messages thereby saving computation time once the information the terminal/application was seeking has been determined. The terminal/application then connects to and begins listening on the channel specified in the beacon message that had tag T, as illustrated by block 70. As a result, and as illustrated by block 72, the terminal/application then begins receiving messages about the desired object and everything else associated with the locale the object is in. A subroutine implementing this process is listed below, again written in ANSI C.

```
void getInformationRegardingTag(char * tag) {
  int channel;
  struct beaconMsg * msg;
  channel = openBeaconChannel();
  for (msg = readFrom(channel); ;msg = readFrom(channel)) {
    if (strcmp(msg->tag, tag)!=0) break;
  }
  closeChannel(channel);
  AssureChannelIsOpen(msg->channel)
  /* code in other parts of the subject system
    read messages from every open channel */
}
```

A method is now described for deciding whether or not to assign a beacon to an object. As mentioned before it is not advisable to give every object a beacon because this would cause there to be an unreasonably large amount of data communicated over the beacon channel. In one embodiment, this problem can be ameliorated by using more than one beacon channel and a many-to-one mapping between beacon tags and beacon channels, commonly referred to as hashing. Using this approach, a terminal/application need only listen to one beacon channel at a time, because it can determine which beacon channel to listen to, based solely on the tag T it is interested in. The hashing is accomplished in one embodiment by computing a checksum of the ASCII characters in the tag and then computing the remainder obtained by dividing the checksum by the number of beacon channels in use. For example, suppose that the checksum of the tag T indicating the janitor 14 was 204 and 5 beacon channels were in use, one would listen to channel 4 because the remainder of 204 divided by 5 is 4.

The above not withstanding it is still not advisable to give every object a beacon because this is an unnecessary use of resources. Rather, beacons should only be assigned to objects that are sufficiently important. One criteria by which the decision is made by the designer of a virtual world is whether or not an object can move from one locale to another. If it cannot move, then its position is known in advance and there is no reason to have to locate it using a beacon. A second criteria is whether the object is of sufficient interest to any terminal/application so that any terminal/application would want to locate it using a beacon. A third criterion is whether an object O is associated with another object P that already has a beacon and therefore any terminal/process that is interested in locating O can do so by locating P using P's beacon and thus O does not need its own beacon.

In summary, sending all the messages about objects in a virtual world via multicasting over separate channels associated with locales allows very efficient computation, but introduces a key problem: how is a terminal/application to find out anything about an object, for instance what locale it is in, unless it already knows what locale it is in. In the subject system, this problem is addressed by introducing beacons that can be located without knowing what locale they are in.

Consider the following example of why beacons are needed and how they are used. Suppose that you have met another person in a virtual world and he asks you to follow him so that he can show you around. An easy way to follow is to attach the visual point of view, or POV, controlling what you see to his representation in the virtual world as a subobject. Your POV will then go wherever he goes and see whatever he sees.

However, what happens if he transfers to another locale? If your terminal/application is already connected to the communication channel associated with the new locale then there is no problem. Your POV remains a subobject of his representation and implicitly moves to the new locale. However, if he moves to a locale your terminal/application is not connected to, you stop receiving any information about him, and he disappears from view. Your POV is thus left dangling in no particular locale. You have lost him with no way to find him again.

The subject system provides special facilities that make it possible to find a beacon no matter where it goes. If someone wants to make it possible for you to reliably follow him, then he has to include a beacon in his representation in the virtual world.

In one embodiment a beacon has the following fields:

Tag—An identifier specified by the creator of the beacon.

Address—The multicast address of the communication channel used by the locale containing the beacon.

The key feature of a beacon is that in addition to broadcasting messages about itself to the locale it is in, it broadcasts messages about itself to a special beacon multicast address. To ensure that this mechanism is scalable to very large virtual environments, an unbounded number of potential subspace multicast addresses are provided. In one embodiment, which address to use is determined by hashing on a beacon's tag.

By default, the subject system does not connect to any beacon channel multicast addresses. As illustrated in FIG. 4, a subroutine is provided whereby an application can request that the subject system listen to the beacon multicast address corresponding to a particular tag. Once the subject system is listening to a beacon multicast address, it maintains information in the world model about all the beacons sending messages to that address. If the terminal/application finds a beacon of interest, it can then request that the subject system connect to the multicast address of the locale containing the beacon.

The only complexity involved with beacons revolves around the ways tags are communicated between users. Suppose that a user U creates a beacon with a tag T and that another user V is interested in finding this beacon. In order for V to find the beacon, V must know T. There are three ways in which this can happen.

First, V may have previously come across the beacon for some other reason and remembered T. This corresponds to the problem of finding the janitor in FIG. 1. Second, U might communicate T to V in some way. For instance, U might send V a message describing some interesting location and give him the name T as a reference. V could then find the location by looking for a beacon tagged with T. Third, V might communicate T to U in some way. For instance, V might advertise some service under the name T. V would then look for beacons with the tag T that act as requests for service.

A program listing for a locales based beacon system, written in ANSI C is now presented.

```
#include <stdlib.h>
#include <signal.h>
#include <stdio.h>
#include <errno.h>
#include <unistd.h>
#include <sys/types.h>
#include <limits.h>
#include <sys/socket.h>
#include <sys/file.h>
#include <netinet/in.h>
#include <net/if.h>
#include <netdb.h>
```

```
#include <pwd.h>
#include <arpa/inet.h>
#include <string.h>
#include <spline.h>
#include <zdebug.h>
#include <spline/time.h>
#include <spline/network.h>
#include <spline/objdefs.h>
#include <spline/share.h>
static int fdcnt = 0;
extern int OBJ;
extern int LOOPAUDIO;
extern int testingSound;
extern void handleSourceActionMsg(spId speakerAction);
extern void checkClasses(void);
void networkAudit(void);
int LOCALE = 0;
#define DEFAULT_TTL 8 /* Time-to-live */
#define DEFAULT_SPLINE_PORT_BASE 8000
#define MAXLOCALES 40
#define TOTALLOCALES 200
#define DROP 0
#define ADD 1
#define NEIGHBOR 0
#define SELF 1
#define BUFFERFULL -1
#define OBJECT_CHANNELS 1
#define AUDIO_STREAM 1
#define TEXT_STREAM 2
#define OBJECT_MASK 0x1
#define AUDIO_MASK 0x2
#define TEXT_MASK 0x4
#define CHANNELS_PER_LOCALE 3
#define Tch SPTAG
#define ATch (SPAUDIO | SPTAG)
#define VTch (SPVISUAL | SPTAG)
#define AVTch (SPAUDIO | SPVISUAL | SPTAG)
#define TOch (SPTAG | SPOTHER)
#define ATOch (SPAUDIO | SPTAG| SPOTHER )
#define VTOch (SPVISUAL | SPTAG | SPOTHER)
#define AVTOch (SPAUDIO | SPVISUAL | SPTAG | SPOTHER)
short bits2bits[] = {
  TOch, ATch, VTch, AVTch, Tch, ATch, VTch, AVTch,
  TOch, ATOch, VTOch, AVTOch, TOch, ATOch, VTOch, AVTOch
};
int i2ch[] = {Tch, ATch, VTch, AVTch, TOch, ATOch, VTOch, AVTOch};
int bits2ch[] = {-1, -1, -1, -1, 0, 1, 2, 3, -1, -1, -1, -1, 4, 5, 6, 7};
typedef struct _localeList {
  spLocale lid;
  struct _localeList *next;
} localeList;
typedef struct {
  char *code;
  long packets;
  long bytes;
  TimeStamp timingtime;
  long timingbytes;
  TimeStamp smalltime;
  long smallbytes;
  long smallpeak;
} Statistics;
Statistics readStats[] =
  {{"rot"}, {"rt"}, {"rvt"}, {"rvto"}, {"rat"},
   {"rato"}, {"ravt"}, {"ravto"}, {"rsa"}, {"rst"}};
Statistics loopStats[] =
  {{"lot"}, {"lt"}, {"lvt"}, {"lvto"}, {"lat"},
   {"lato"}, {"lavt"}, {"lavto"}, {"lsa"}, {"lst"}};
Statistics unloopStats[] =
  {{"uot"}, {"ut"}, {"uvt"}, {"uvto"}, {"uat"},
   {"uato"}, {"uavt"}, {"uavto"}, {"usa"}, {"ust"}};
Statistics subspaceStatsIn = {"subspace-r"};
Statistics subspaceStatsOut = {"subspace-w"};
```

```
/* there's one of these for each locale being listened to */
typedef struct {
  spLocale lid;
  spId pov;
  int selfPOVCount[CHANNELS_PER_LOCALE];
  int totalPOVCount[CHANNELS_PER_LOCALE];
} LocaleInfo;
/* these arrays are kept in sync */
static LocaleInfo *locales[MAXLOCALES];
static struct pollfd objfds[MAXLOCALES];
static struct pollfd audiofds[MAXLOCALES];
static struct pollfd textfds[MAXLOCALES];
static int localecnt = 0;
/* there's one of these for each locale */
typedef struct {
  int index; /* index into array of locales being listened to */
  int loopOut; /* fd for looped output */
  int unloopOut; /* fd for unlooped output */
  TimeStamp lastsend; /* time of last networkSend() */
  int numNeighbors;
  struct LocaleNeighbor **neighbors;
} LocaleFD;
static LocaleFD lfd[TOTALLOCALES];
static int badversion = 0;
/* reused for every outgoing msg */
struct sockaddr_in outgoing;
static int ttl;
static unsigned baseaddr;
static unsigned subspaceaddr;
static struct pollfd subspacefd[1];
static int subspaceout;
u_short spBasePort = DEFAULT_SPLINE_PORT_BASE;
static int estimateTimeDelay(Message *msg);
/* callback functions set in spvisual.c */
void (*graphicsChangeLocaleHook)(spId, void *) = NULL;
void (*graphicsRemoveLocaleHook)(spLocale) = NULL;
int maxfd = 0;
static u_short subspacePort(void) {
  return spBasePort - 1;
}
static u_short localePort(spLocale lid, int type) {
  int foo = (type < OBJECT_CHANNELS) ? 0 : 1;
  return spBasePort + (u_short) (2*lid + foo);
}
static unsigned localeAddr(spLocale lid, int type) {
  return (unsigned) (baseaddr + (lid << 8) + type);
}
/* channel on which to send msgs about id */
static int msgType(spId id) {
  if (subclass(getClass(id), spcSourceAction)) {
    return AUDIO_STREAM;
  }
  else {
    return 0;
  }
}
boolean isSubspaceObj(spId id) {
  spId cid = getClass(id);
  if (subclass(cid, spcMicrophone)) return TRUE;
  /* we don't want everyone, especially spaudio, to
     always have all of the speakers */
  if (subclass(cid, spcSpeaker)) return FALSE;
  if (subclass(cid, spcBeacon)) return TRUE;
  if (subclass(cid, spcLocaleLink)) return TRUE;
  return FALSE;
}
spId localeOf(spId id) {
  spId p;
  for (p=id; p; p=getParent(p)) {
    if (subclass(getClass(p), spcLocaleLink)) return p;
  }
  return NULL;
```

```
}
spLocale localeIdOf(spId id) {
  if (id == NULL) return NOLOCALE;
  return getLocaleId(id);
}
boolean myNeighbor(spLocale me, spLocale neighbor) {
  int n;
  for (n=0; n<lfd[me].numNeighbors; n++) {
    if (lfd[me].neighbors[n]->localeId == neighbor) {
      return TRUE;
    }
  }
  return FALSE;
}
spTMatrix *matrixFromTo(spLocale from, spLocale to) {
  int n;
  for (n=0; n<lfd[from].numNeighbors; n++) {
    if (lfd[from].neighbors[n]->localeId == to) {
      return &(lfd[from].neighbors[n]->transform);
    }
  }
  return NULL;
}
/****************************************************************************
 * FUNCTION:     MCopen()
 * DESCRIPTION:    Open a port to a multicast socket configured for sending
 *                 or receiving.
 *
 * ARGUMENTS:    port:       port number to connect on
 *               send:       1 if opening for sending, 0 for receiving
 *               wantloop:   1 if msgs sent should loopback to this machine
 *               ttl:        time-to-live
 *
 * SYNOPSIS:     Called to open a multicast socket. Performs all necessary
 *               interface checking, and, if successful, passes back a file
 *               descriptor and address structure.
 *
 * RETURNS:      fd on successful opening
 ****************************************************************************/
int MCopen(u_short port, boolean send, boolean wantloop, int ttl) {
  int fd;
  int on = 1;
  u_char loop = 0;
  u_char ttl_uc = ttl;
  struct in_addr ifaddr;
  if (fdcnt > 125) {
    int i;
    int earliest = INT_MAX;
    int oneToClose = -1;
    for (i=0; i<TOTALLOCALES; i++) {
      if ((lfd[i].loopOut || lfd[i].unloopOut)
          && lfd[i].lastsend < earliest) {
        earliest = lfd[i].lastsend;
        oneToClose = i;
      }
    }
    if (assert(oneToClose >= 0)) {
      ZZ(LOCALE) zprintf("Closing down locale 0x%x\n", oneToClose);
      if (lfd[oneToClose].loopOut) {
        close(lfd[oneToClose].loopOut);
        lfd[oneToClose].loopOut = 0;
        fdcnt--;
      }
      if (lfd[oneToClose].unloopOut) {
        close(lfd[oneToClose].unloopOut);
        lfd[oneToClose].unloopOut = 0;
        fdcnt--;
      }
    }
  }
  assert((fd = socket(AF_INET, SOCK_DGRAM, 0)) > 0);
  if (send) {
```

```
    zero(setsockopt(fd, IPPROTO_IP, IP_MULTICAST_TTL,
                    &ttl_uc, sizeof(ttl_uc)));
    /*
     * Turn looping off if packets should not go back to the same host.
     * This means that multiple instances of this program will not
     * receive packets from each other.
     */
    if (!wantloop) {
      zero(setsockopt(fd, IPPROTO_IP, IP_MULTICAST_LOOP,
                      &loop, sizeof(loop)));
    }
  }
  else { /* receive */
    struct sockaddr_in addr;
    addr.sin_family = AF_INET;
    addr.sin_addr.s_addr = htonl(INADDR_ANY);
    addr.sin_port = htons(port);
    /* use the default interface */
    ifaddr.s_addr = htonl(INADDR_ANY);
    /*
     * Allow multiple instances of this program to listen on the same
     * port on the same host. By default, only 1 program can bind
     * to the port on a host.
     */
    zero(setsockopt(fd, SOL_SOCKET, SO_REUSEPORT, &on, sizeof(on)));
    zero(bind(fd, &addr, sizeof(struct sockaddr_in)));
  }
  /* non-blocking */
  assert(fcntl(fd, F_SETFL, FNDELAY) != -1);
  fdcnt++;
  if (fd > maxfd) maxfd = fd;
  ZZZ(LOCALE) zprintf("%d %s on %d\n", fd,
                      (send) ? "sending" : "receiving", port);
  return fd;
}
void MCcreateaddress(struct sockaddr_in *address, unsigned group) {
  assert(IN_MULTICAST(group));
  bzero((char *) address, sizeof(struct sockaddr_in));
  address->sin_family = AF_INET;
  address->sin_addr.s_addr = htonl(group);
}
struct sockaddr_in *MCsetaddr(struct sockaddr_in *address,
                              unsigned group, u_short port) {
  assert(IN_MULTICAST(group));
  address->sin_addr.s_addr = htonl(group);
  address->sin_port = htons(port);
  return address;
}
void MCjoin(int fd, unsigned group) {
  struct ip_mreq mreq;
  struct in_addr ifaddr;
  struct in_addr grpaddr;
  grpaddr.s_addr = htonl(group);
  assert(IN_MULTICAST(grpaddr.s_addr));
  ifaddr.s_addr = htonl(INADDR_ANY);
  mreq.imr_multiaddr = grpaddr;
  mreq.imr_interface = ifaddr;
  zero(setsockopt(fd, IPPROTO_IP, IP_ADD_MEMBERSHIP,
                  &mreq, sizeof(mreq)));
  ZZZ(LOCALE) zprintf("%d joining %08x\n", fd, group);
}
void MCleave(int fd, unsigned group) {
  struct ip_mreq mreq;
  struct in_addr ifaddr;
  struct in_addr grpaddr;
  grpaddr.s_addr = htonl(group);
  assert(IN_MULTICAST(grpaddr.s_addr));
  ifaddr.s_addr = htonl(INADDR_ANY);
  mreq.imr_multiaddr = grpaddr;
  mreq.imr_interface = ifaddr;
  zero(setsockopt(fd, IPPROTO_IP, IP_DROP_MEMBERSHIP,
                  &mreq, sizeof(mreq)));
```

```c
  ZZZ(LOCALE) zprintf("%d leaving %08x\n", fd, group);
}
static void initStats(Statistics *stats) {
  stats->packets = stats->bytes = stats->timingbytes =
    stats->smallbytes = stats->smallpeak = 0;
  stats->timingtime = stats->smalltime = GetT();
}
#define REPORTPERIOD 500 /* packets */
#define SMALLTIME 50 /* msec */
#define RATE(stats, sbytes, stime) \
  ((8*1000*((stats)->bytes - sbytes)/(now - stime))/1024)
static void doStats(Statistics *stats, Message *msg) {
  if (stats == NULL) return;
  stats->packets++;
  stats->bytes += msg->MsgLength;
  ZZ(NET) {
    TimeStamp now = GetT();
    if (now - stats->smalltime > SMALLTIME) {
      long load = RATE(stats, stats->smallbytes, stats->smalltime);
      if (load > stats->smallpeak) stats->smallpeak = load;
      stats->smallbytes = stats->bytes;
      stats->smalltime = now;
    }
    if ((stats->packets % REPORTPERIOD) == 0) {
      zprintf("%s %dk bits/sec average, %dk bits/sec peak\n",
              stats->code, RATE(stats, stats->timingbytes,
                                       stats->timingtime), stats->smallpeak);
      stats->timingbytes = stats->bytes;
      stats->timingtime = now;
      stats->smallpeak = 0;
    }
  }
  ZZZZ(NET) {
    printf("%s%d ", stats->code, msg->MsgLength);
    fflush(stdout);
  }}
#undef RATE
void MCwrite(int fd, struct sockaddr_in *address, Message *msg) {
  if (!assert(address != NULL && msg != NULL)) {
    zwarn("Can't write, null argument(s)\n");
    return;
  }
  if (thisproc->fakePartner) toggleNames((spId)msg);
  assert(msg->MsgLength<LONGESTMSG);
  assert(sendto(fd, (char *)msg, msg->MsgLength, 0,
                   address, sizeof(struct sockaddr_in)) >= 0);
  /* must be sure to fix them up too. */
  if (thisproc->fakePartner) toggleNames((spId)msg);
}
static char msgtodrop[LONGESTMSG];
int MCread(int fd, char *message, int len) {
  int cnt;
  if (message == NULL) {
    message = msgtodrop;
    len = sizeof(msgtodrop);
    ZZ(NET) zprintf("Dropping msg.\n");
  }
  assert((cnt = recv(fd, message, len, 0)) >= 0);
  return (message == msgtodrop) ? BUFFERFULL : cnt;
}
static boolean localeInWM(spId locale, void *locinfo) {
  LocaleInfo *loc = (LocaleInfo *) locinfo;
  if (getLocaleId(locale) == loc->lid) {
    informNetworkLocaleIsReady(loc->lid, locale);
    return TRUE;
  }
  return FALSE;
}
/* this adds a locale to the list of locales that are
   being listened to */
static void addLocale(spLocale lid) {
  LocaleInfo *loc;
```

19

```
  long i;
  if (lid == NOLOCALE) return;
  if (lfd[lid].index >= 0) {
    /* locale already in table */
    return;
  }
  if (localecnt == MAXLOCALES) {
    zwarn("Locale space is full; ignoring new locale %d\n", lid);
    return;
  }
  lfd[lid].index = localecnt++;
  loc = locales[lfd[lid].index];
  Z(LOCALE) zprintf("Creating locale 0x%x in slot %d\n", lid, lfd[lid].index);
  assert(lid >= 0 && lid <= 255);
  loc->lid = lid;
  loc->pov = NULL;
  for (i=0; i<CHANNELS_PER_LOCALE; i++) {
    loc->selfPOVCount[i] = loc->totalPOVCount[i] = 0;
  }
  spExamineWorldModel(spcLocaleLink, localeInWM, (void *)loc);
  return;
}
static int findLocale(spLocale lid) {
  if (lid == NOLOCALE) return -1;
  addLocale(lid);
  return lfd[lid].index;
}
static void removeLocale(long i) {
  LocaleInfo *loc = locales[i];
  Z(LOCALE) zprintf("Removing locale 0x%x\n", loc->lid);
  lfd[loc->lid].index = -1;
  if (graphicsRemoveLocaleHook != NULL)
    graphicsRemoveLocaleHook(loc->lid);
  if (loc->pov) {
    setParent(loc->pov, NULL);
  }
  localecnt--;
  if (objfds[i].fd) {
    close(objfds[i].fd);
    fdcnt--;
  }
  objfds[i].fd = objfds[localecnt].fd;
  objfds[localecnt].fd = 0;
  if (audiofds[i].fd) {
    close(audiofds[i].fd);
    fdcnt--;
  }
  audiofds[i].fd = audiofds[localecnt].fd;
  audiofds[localecnt].fd = 0;
  if (textfds[i].fd) {
    close(textfds[i].fd);
    fdcnt--;
  }
  textfds[i].fd = textfds[localecnt].fd;
  textfds[localecnt].fd = 0;
  if (i < localecnt) {
    locales[i] = locales[localecnt];
    locales[localecnt] = loc;
    lfd[locales[i]->lid].index = i;
  }
}
static void modifyChannel(int lindex, int type, boolean add, boolean self) {
  struct pollfd *fds;
  LocaleInfo *loc;
  if (lindex == -1) return;
  loc = locales[lindex];
  assert(type >= 0);
  if (type < OBJECT_CHANNELS) {
    fds = objfds;
  }
  else if (type == AUDIO_STREAM) {
    fds = audiofds;
```

```
    }
    else if (type == TEXT_STREAM) {
      fds = textfds;
    }
    else {
      zwarn("Bad type.\n");
      return;
    }
    if (add) {
      if (self) loc->selfPOVCount[type]++;
      if (loc->totalPOVCount[type]++ == 0) {
        if (fds[lindex].fd == 0) {
          fds[lindex].fd = MCopen(localePort(loc->lid, type), FALSE, FALSE, ttl);
          fds[lindex].events = POLLIN;
        }
        MCjoin(fds[lindex].fd, localeAddr(loc->lid, type));
      }
    }
    else {
      if (self) loc->selfPOVCount[type]--;
      if (--loc->totalPOVCount[type] == 0) {
        MCleave(fds[lindex].fd, localeAddr(loc->lid, type));
      }
    }
    ZZZ(LOCALE) zprintf("%s %s count(%d/%d), type %d, "
                        "locale 0x%x\n",
                        (add) ? "+" : "-",
                        (self) ? "self" : "neighbor",
                        loc->selfPOVCount[type], loc->totalPOVCount[type],
                        type, loc->lid);
    if (!assert(loc->selfPOVCount[type] >= 0)) {
      loc->selfPOVCount[type] = 0;
    }
    if (!assert(loc->totalPOVCount[type] >= 0)) {
      loc->totalPOVCount[type] = 0;
    }
  }
  static void considerRemoval(void) {
    int lindex = 0;
    while (lindex < localecnt) {
      LocaleInfo *loc = locales[lindex];
      int i;
      boolean toss = TRUE;
      for (i=0; toss && i<CHANNELS_PER_LOCALE; i++) {
        if (loc->totalPOVCount[i]) toss = FALSE;
      }
      if (toss) removeLocale(lindex); /* decrements localecnt */
      else lindex++;
    }
  }
  /* add or drop the type channel from all the neighbors of locale */
  static void modifyNeighbors(spLocale lid, int type, boolean add) {
    int n;
    for (n=0; n<lfd[lid].numNeighbors; n++) {
      modifyChannel(findLocale(lfd[lid].neighbors[n]->localeId),
                    type, add, NEIGHBOR);
    }
  }
  /* in all neighbors of the locale, add whatever channels this
     locale is listening to */
  static void addNeighbors(spLocale lid) {
    int n;
    int type;
    int lindex = lfd[lid].index;
    LocaleInfo *loc = locales[lindex];
    assert(lindex != -1);
    for (n=0; n<lfd[lid].numNeighbors; n++) {
      for (type=0; type<CHANNELS_PER_LOCALE; type++) {
        if (loc->selfPOVCount[type] > 0) {
          modifyChannel(findLocale(lfd[lid].neighbors[n]->localeId),
                        type, ADD, NEIGHBOR);
        }
```

21

```c
      }
    }
  }
  /* Called when a locale enters the world model
     and when a locale is added to the list of active locales.
     Starts listening in the neighbors, as needed. */
  void informNetworkLocaleIsReady(spLocale localeId, spId id) {
    int lindex;
    /* locale already known to us */
    if (lfd[localeId].numNeighbors != 0) return;
    lfd[localeId].numNeighbors = getLocaleNumNeighbors(id);
    lfd[localeId].neighbors = (struct LocaleNeighbor **)getLinkData(id);
    lindex = lfd[localeId].index;
    if (lindex == -1) return;
    /* we are listening, so consider adding in neighbors */
    addNeighbors(localeId);
    if (locales[lindex]->pov && getParent(locales[lindex]->pov) == NULL) {
      setParent(locales[lindex]->pov, id);
    }
  }
  /* send out a spId */
  void networkSend(spId id) {
    int chan = msgType(id);
    unsigned addr;
    u_short port;
    int fd;
    Statistics *stats;
    int lid = getLocaleId(id);
    considerRemoval();
    if (lid == NOLOCALE) return;
    if (isSubspaceObj(id)) {
      addr = subspaceaddr;
      port = subspacePort();
      fd = subspaceout;
      stats = &subspaceStatsOut;
    }
    else {
      addr = localeAddr(lid, chan);
      port = localePort(lid, chan);
      lfd[lid].lastsend = thisproc->wm->wmtime;
      if (chan == AUDIO_STREAM && !ZTEST(LOOPAUDIO, 1)) {
        if (lfd[lid].unloopOut == 0) {
          lfd[lid].unloopOut = MCopen(port, TRUE, FALSE, ttl);
        }
        fd = lfd[lid].unloopOut;
        stats = &unloopStats[chan];
      }
      else {
        if (lfd[lid].loopOut == 0) {
          lfd[lid].loopOut = MCopen(port, TRUE, TRUE, ttl);
        }
        fd = lfd[lid].loopOut;
        stats = &loopStats[chan];
      }
    }
    setMsgSendTime(id, GetT());
    if (getMsgNeeded(id)) {
      setTimeOfUpdate(id, thisproc->wm->wmtime);
      setMessagesSinceUpdate(id, 1);
    }
    else {
      setMessagesSinceUpdate(id, getMessagesSinceUpdate(id)+1);
    }
    if (subclass(getClass(id), spcBeacon)) {
      setBeaconLocaleId(id, localeIdOf(id));
      setBeaconMulticastPort(id, addr & 0xfffffff0);
    }
    ZZZ(OBJ) zprintf("sending obj (0x%08x-%s) to %08x/%d\n",
                     id, getClassName(getClass(id)), addr, port);
    setMsgAddr(id, addr);
    MCwrite(fd, MCsetaddr(&outgoing, addr, port), (Message *)id);
    doStats(stats, (Message *)id);
```

```
    ZZZ(NET) zprintf("sent obj (0x%08x-%s) to %08x/%d\n",
                     id, getClassName(getClass(id)), addr, port);
}
static int typeFromAddr(unsigned addr) {
  return (addr & 0xf);
}
#define MAXLOST 100
struct lostmsg {
  unsigned addr;
  unsigned sender;
  int count;
  int type;
} lostmsgs[MAXLOST];
int lostcnt = 0;
static void reportlost(void) {
  static unsigned lastwarning = 0;
  spDuration d = TDelta(thisproc->wm->wmtime, lastwarning);
  uid_t uid;
  struct passwd *pwd;
  struct in_addr address;
  struct hostent *host;
  struct lostmsg *lost;
  int i;
  /* for each source of wayward msgs, give one warning per minute */
  if (d < 0 || d > 60000) {
    if (badversion > 0) {
      zprintf("Rejected %d packets with wrong version number.\n", badversion);
      badversion = 0;
    }
    lastwarning = thisproc->wm->wmtime;
    for (i=0; i<lostcnt; i++) {
      lost = &lostmsgs[i];
      if (lost->count > 0) {
        uid = (lost->addr>>16) - (225<<8);
        pwd = getpwuid(uid);
        address.s_addr = htonl(lost->sender);
        host = gethostbyaddr(&address, sizeof(struct in_addr), AF_INET);
        errno = 0;
        zprintf("Ignored %d type#%d msg(s) from locale%d.%s@%s\n",
                lost->count, lost->type, (lost->addr&0xff00)>>8,
                (pwd) ? pwd->pw_name : "unknown",
                (host) ? host->h_name : "unknown");
        lost->count = 0;
      }
    }
  }
}
static void networkReceive(Message *msg, LocaleInfo *loc) {
  unsigned addr = msg->MsgAddr;
  int type = typeFromAddr(addr);
  boolean found = FALSE;
  struct lostmsg *lost;
  int i;
  if (msg->MsgCode != SPLINEVERSION) {
    badversion++;
  }
  else if (addr == subspaceaddr) {
    estimateTimeDelay(msg);
    doStats(&subspaceStatsIn, msg);
    processObjMsg(msg);
    Z(OBJ) checkClasses();
    Z(LOCALE) networkAudit();
  }
  else if ((addr & 0xffff0000) != baseaddr || loc == NULL
           || loc->totalPOVCount[type] == 0) {
    for (i=0; i<lostcnt; i++) {
      lost = &lostmsgs[i];
      if (addr == lost->addr && msg->MsgSender == lost->sender) {
        found = TRUE;
        lost->count++;
        break;
      }
```

```
      }
      if (!found) {
        if (lostcnt < MAXLOST-1) {
          lost = &lostmsgs[lostcnt++];
          lost->type = type;
          lost->addr = addr;
          lost->sender = msg->MsgSender;
          lost->count = 0;
        }
      }
    }
    else {
      if (type >= 0 && type < OBJECT_CHANNELS) {
        estimateTimeDelay(msg);
        doStats(&readStats[type], msg);
        processObjMsg(msg);
        Z(OBJ) checkClasses();
        Z(LOCALE) networkAudit();
      }
      else if (type == AUDIO_STREAM) {
        /* if doing some internal testing, leave times alone! */
        if (!testingSound) estimateTimeDelay(msg);
        doStats(&readStats[type], msg);
        handleSourceActionMsg((spId) msg);
      }
      else {
        zwarn("Can't deliver msg to 0x%08x\n", addr);
      }
    }
    Z(NET) reportlost();
}
typedef unsigned *usp;
static int processMsgs(struct pollfd *fds, int fdcnt, int max) {
  int cnt;
  long lindex;
  char msg[LONGESTMSG];
  int n = 0;
  do {
    if (!assert((cnt = poll(fds, fdcnt, 0)) >= 0)) {
      zwarn("poll returned %d\n", fds[0].revents);
    }
    if (cnt > 0) {
      for (lindex=0; lindex<fdcnt; lindex++) {
        if (fds[lindex].fd != 0 && fds[lindex].revents & POLLIN) {
          if (MCread(fds[lindex].fd, msg, LONGESTMSG) > 0) {
            networkReceive((Message *)msg, locales[lindex]);
            n++;
            if (max > 0 && n >= max) return n;
          }
        }
      }
    }
  } while (cnt > 0);
  return n;
}
static int max = 100;
void processIncomingMsgs(void) {
  int n, s;
  static int in_a_row = 0;
  n = processMsgs(objfds, localecnt, max);
  if (subspacefd[0].fd > 0)
    s = processMsgs(subspacefd, 1, max);
  else s = 0;
  ZZZZ(LOCALE) if (n+s > 0) zprintf("%d/%d msgs processed\n", n, s);
  /* try to smooth out message receipt so big waves of msgs
     get spread over several frames, but if we just aren't getting
     them all after 6 frames, process them all */
  if (n == max || s == max) {
    if (++in_a_row > 1) {
      n = processMsgs(objfds, localecnt, 0);
      s = processMsgs(subspacefd, 1, 0);
      in_a_row = 0;
```

```
      max += 2;
      Z(NET) zprintf("Bumping max msgs per frame to %d (%d + %d left over)\n",
                     max, n, s);
    }
  } else in_a_row = 0;
}
/* This processes any pending sound messages.  It adds in extra
   latency to wait until you need the data before processing any
   messages, but it means we do not have to have a separate thread.
   We will do something better later.*/
void processPendingSoundMsgs(void) {
  processMsgs(audiofds, localecnt, 0);
}
short bits2chan(short bits) {
  int i;
  short chan = 0;
  zero(bits & ~0xf);
  /* these bits must be on */
  bits = bits2bits[bits & 0xf];
  for (i=0; i<OBJECT_CHANNELS; i++) {
    int channel = i2ch[i];
    if (channel & bits == channel) chan |= (1 << i);
  }
  return chan;
}
static boolean parentPOV(spId locale, void *data) {
  LocaleInfo *loc = (LocaleInfo *) data;
  if (getLocaleId(locale) == loc->lid) {
    setParent(loc->pov, locale);
    return TRUE;
  }
  return FALSE;
}
static void modifyListener(spId pov, short newbits,
                           spLocale locale, boolean new) {
  int lindex;
  short oldbits;
  short changes;
  int i;
  LocaleInfo *loc;
  if (checkId(pov, spcBeacon, FALSE)) return;
  if (locale == NOLOCALE) locale = localeIdOf(pov);
  lindex = findLocale(locale);
  if (lindex < 0) {
    zwarn("Trying to listen to nothing.\n");
    return;
  }
  loc = locales[lindex];
  if (loc->pov == NULL) {
    loc->pov = spMake(spcPOV);
    setBeaconPort(loc->pov, -1);
    setLocaleId(loc->pov, NOLOCALE);
  }
  if (getParent(loc->pov) == NULL) {
    spExamineWorldModel(spcLocaleLink, parentPOV, loc);
  }
  oldbits = (new) ? 0 : getListeningBits(pov);
  changes = oldbits ^ newbits;
  setListeningBits(pov, newbits);
  if (lindex != -1) {
    for (i=0; i<CHANNELS_PER_LOCALE; i++) {
      if (changes & (1 << i)) {
        modifyChannel(lindex, i, newbits & (1 << i), SELF);
        modifyNeighbors(loc->lid, i, newbits & (1 << i));
      }
    }
  }
}
void spListen(spId pov) {
  modifyListener(pov,
                 bits2chan(getTagFilterBits(pov))
                 | (getListeningBits(pov) & (AUDIO_MASK | TEXT_MASK)),
```

```
                    NOLOCALE, FALSE);
}
void spStopListening(spId pov) {
  modifyListener(pov, getListeningBits(pov) & (AUDIO_MASK | TEXT_MASK),
                 NOLOCALE, FALSE);
}
void spListenForAudioStreams(spId pov) {
  modifyListener(pov, getListeningBits(pov) | AUDIO_MASK, NOLOCALE, FALSE);
}
void stopAudioStreams(spId pov) {
  modifyListener(pov, getListeningBits(pov) & ~AUDIO_MASK, NOLOCALE, FALSE);
}
void spListenForTextStreams(spId pov) {
  modifyListener(pov, getListeningBits(pov) | TEXT_MASK, NOLOCALE, FALSE);
}
void stopTextStreams(spId pov) {
  modifyListener(pov, getListeningBits(pov) & ~TEXT_MASK, NOLOCALE, FALSE);
}
void stopAllListening(spId pov) {
  if (getListeningBits(pov) && OBJECT_MASK) spStopListening(pov);
  if (getListeningBits(pov) && AUDIO_MASK) stopAudioStreams(pov);
  if (getListeningBits(pov) && TEXT_MASK) stopTextStreams(pov);
}
static void openSubspace(unsigned int hostnum) {
  if (subspacefd[0].fd <= 0) {
    subspacefd[0].fd = MCopen(subspacePort(), FALSE, FALSE, ttl);
    subspacefd[0].events = POLLIN;
    MCjoin(subspacefd[0].fd, subspaceaddr);
  }
}
void spListenForBeacon(spId beacon) {
  openSubspace(getBeaconHost(beacon));
  return;
}
void spListenForBeacons(spHost hostNum) {
  openSubspace(hostNum);
  return;
}
int self[TOTALLOCALES][CHANNELS_PER_LOCALE];
int total[TOTALLOCALES][CHANNELS_PER_LOCALE];
static boolean computeCount(spId pov, void *ignore) {
  int listening = getListeningBits(pov);
  spLocale lid;
  int n, type;
  if (listening) {
    for (type=0; type<CHANNELS_PER_LOCALE; type++) {
      if (listening & (1 << type)) {
        lid = localeIdOf(pov);
        if (lid != NOLOCALE) {
          self[lid][type]++;
          total[lid][type]++;
          for (n=0; n<lfd[lid].numNeighbors; n++) {
            total[lfd[lid].neighbors[n]->localeId][type]++;
          }
        }
      }
    }
  }
  return FALSE;
}
void networkAudit(void) {
  int count = 0;
  int i, type;
  for (i=0; i<TOTALLOCALES; i++) {
    for (type=0; type<CHANNELS_PER_LOCALE; type++) {
      self[i][type] = total[i][type] = 0;
    }
  }
  spExamineWorldModel(spcPOV, computeCount, NULL);
  for (i=0; i<TOTALLOCALES; i++) {
    int any = 0;
    int counted = 0;
```

26

```
    for (type=0; type<CHANNELS_PER_LOCALE; type++) {
      if (self[i][type]) {
        assert(lfd[i].index != NOLOCALE);
        assert(self[i][type] == locales[lfd[i].index]->selfPOVCount[type]);
        any++;
      }
      if (total[i][type]) {
        assert(lfd[i].index != NOLOCALE);
        assert(total[i][type] == locales[lfd[i].index]->totalPOVCount[type]);
        any++;
        if (!counted) {
          count++;
          counted++;
        }
      }
    }
    if (!any) {
      for (type=0; type<CHANNELS_PER_LOCALE; type++) {
        if (lfd[i].index != NOLOCALE) {
          assert(locales[lfd[i].index]->selfPOVCount[type] == 0);
          assert(locales[lfd[i].index]->totalPOVCount[type] == 0);
        }
      }
    }
    if (lfd[i].index == -1) {
      assert(!any);
    }
    else {
      if (lfd[i].index < localecnt) {
        assert(locales[lfd[i].index]->lid == i);
      }
    }
  }
  assert(count == localecnt);
  for (i=0; i<localecnt; i++) {
    if (locales[i]->pov) {
      assert((getParent(locales[i]->pov) == NULL) ||
              getLocaleId(locales[i]->pov) == locales[i]->lid);
    }
  }
}
spLocale lookingfor = -2;
static void incUnsatisfied(spLocale lid) {
  if (lookingfor == -2) lookingfor = lid;
  else {
    if (lid != lookingfor) lookingfor = -1;
  }
  if (thisproc->wm->oldestUnsatisfied == 0) {
    thisproc->wm->oldestUnsatisfied = thisproc->wm->wmtime;
  }
  thisproc->wm->newestUnsatisfied = thisproc->wm->wmtime;
}
/* find if we have the locale, or any of its neighbors */
static boolean dopov(spId locale, void *data) {
  spLocale newlid = (spLocale) data;
  int lid = getLocaleId(locale);
  if (lid == newlid) {
    /* this process has information about that locale */
    incUnsatisfied(newlid);
    return TRUE;
  }
  else {
    int nn = getLocaleNumNeighbors(locale);
    struct LocaleNeighbor **N = (struct LocaleNeighbor **)getLinkData(locale);
    int n;
    for (n=0; n<nn; n++) {
      if (N[n]->localeId == newlid) {
        incUnsatisfied(newlid);
        return FALSE;
      }
    }
  }
```

```
    return FALSE;
  }
  /* This is called when POVs from other processes change their locale.
     We are responsible for sending any objects we have that are
     in that locale or its neighbors. */
  extern void POVEnteringFrom(spLocale newlid, spLocale oldlid) {
    /* the POV is lost; we should broadcast now */
    if (newlid == NOLOCALE) {
      incUnsatisfied(newlid);
      return;
    }
    /* we are listening in that locale; assume we have something */
    if (lfd[newlid].index != NOLOCALE) {
      incUnsatisfied(newlid);
      return;
    }
    spExamineWorldModel(spcLocaleLink, dopov, (void *) newlid);
  }
  /* If this pov is a descendant of an object changing locales,
     then we need to stop listening wherever it was listening,
     and start listening wherever it is moving to. */
  boolean relocatePOV(spId pov, void *reparent) {
    int listening = getListeningBits(pov);
    struct reparent *reloc = (struct reparent *)reparent;
    extern boolean spDescendant(spId child, spId parent);
    boolean shouldconsider = FALSE;
    if (spDescendant(pov, reloc->child)) {
      if (listening) {
        if (reloc->oldl != NOLOCALE) {
          /* stop listening through this pov in the old locale */
          modifyListener(pov, 0, reloc->oldl, FALSE);
          shouldconsider = TRUE;
        }
        if (reloc->newl != NOLOCALE) {
          /* add the effect of listening through this pov
             to the new locale */
          modifyListener(pov, listening, reloc->newl, TRUE);
        }
      }
      /* tell the graphics to switch models */
      if (graphicsChangeLocaleHook != NULL) {
        graphicsChangeLocaleHook(pov, reloc);
      }
      /* May be able to gc some old locales.
         We waited because the new locale probably neighbors many
         of the same locales, and we don't want to thrash them
         in and out. */
      if (shouldconsider) considerRemoval();
    }
    return FALSE;
  }
  /* If present, SPLINEADDRESS is used as the multicast base address.
     Else SPLINENAME (must be a userid) is used to compute it.
     */
  void networkInit() {
    extern char *getenv();
    char *address = getenv("SPLINEADDRESS");
    char *name = getenv("SPLINENAME");
    char *ttls = getenv("SPLINETTL");
    char *portstr = getenv("SPLINEPORT");
    char group[32];
    uid_t uid = 0;
    long i;
    assert(LOCALE = zregister("locale", "locale"));
    if (portstr != NULL) {
      spBasePort = (u_short) atoi(portstr);
    }
    if (address != NULL) strcpy(group, address);
    else {
      if (name == NULL) uid = getuid();
      else {
        struct passwd *pwd = getpwnam(name);
```

```
      if (pwd) uid = pwd->pw_uid;
      else {
        zwarn("Bad SPLINENAME: %s, using session 0.\n", name);
      }
    }
    sprintf(group, "%ld.%ld.0.0", 225+((uid & 0xff00) >> 8), uid & 0xff);
  }
  baseaddr = inet_addr(group);
  Z(NET) zprintf("Network base address is 0x%08x\n", baseaddr);
  assert((baseaddr & 0xffff) == 0);
  assert(IN_MULTICAST(baseaddr));
  ttl = (ttls == NULL) ? DEFAULT_TTL : atoi(ttls);
  subspacefd[0].fd = 0;
  subspaceout = MCopen(subspacePort(), TRUE, TRUE, ttl);
  for (i=0; i<MAXLOCALES; i++) {
    locales[i] = (LocaleInfo *)malloc(sizeof(LocaleInfo));
    objfds[i].fd = audiofds[i].fd = textfds[i].fd = 0;
  }
  for (i=0; i<TOTALLOCALES; i++) {
    lfd[i].index = -1;
    lfd[i].loopOut = 0;
    lfd[i].unloopOut = 0;
  }
  for (i=0; i<CHANNELS_PER_LOCALE; i++) {
    initStats(&readStats[i]);
    initStats(&loopStats[i]);
    initStats(&unloopStats[i]);
  }
  thisproc->wm->oldestUnsatisfied = 0;
  subspaceaddr = baseaddr | 0xffff;
  /* the actual address will be filled in later */
  MCcreateaddress(&outgoing, subspaceaddr);
  /* force everyone to listen */
  spListenForBeacons(spDisplayHost());
}
/* T I M I N G */
#define MAXSPLINES 20
struct NetDelayInfo {
  long int sender;
  DelayInfo delayInfo;
};
struct NetDelayInfo netDelays[MAXSPLINES];
int netDelaysIndex = 0;
DelayInfo * netDelayOf(long sender) {
  int i;
  for (i=0; i<netDelaysIndex; i++) {
    if (netDelays[i].sender == sender) return &netDelays[i].delayInfo;
  }
  return NULL;
}
/* This is used to shift all the times in an object to adjust them to
   take account of message transit times and clock differences between
   machines.  Note this decoding operation is not idempotent.  You must
   be careful not to call it twice on the same message. */
int shiftAllTimes(Message *id, TimeStamp delta) {
  int i;
  TimeStamp * timePtr;
  spId class;
  for (class = lookup(id->Class); class; class = getSuperclass(class)) {
    for (i = getClassNumFields(class)-1; i >= 0; i--) {
      if (fieldTIME & getClassFields(class)[i].properties) {
        timePtr = (TimeStamp *)((char *)id + getClassFields(class)[i].offset);
        *timePtr = TPlus(*timePtr, delta);
      }
    }
  }
  return 0;
}
int shiftTimes(Message *id, TimeStamp delta) {
  int i;
  TimeStamp * timePtr;
  spId class;
```

```
  for (class = lookup(id->Class); class; class = getSuperclass(class)) {
    for (i = getClassNumFields(class)-1; i >= 0; i--) {
      if (fieldTIME & getClassFields(class)[i].properties &&
          !(fieldLOCAL & getClassFields(class)[i].properties)) {
        timePtr = (TimeStamp *)((char *)id + getClassFields(class)[i].offset);
        *timePtr = TPlus(*timePtr, delta);
      }
    }
  }
  return 0;
}
/* This assumes the msg is a message describing some object.  To get
   time adjustments right, we also assume that this is called on EVERY
   incoming message and that nobody ever looks at a time until correct
   adjustment has been made.  */
int estimateTimeDelay(Message *msg) {
  TimeStamp correction;
  DelayInfo *netDelay;
  /* must remove this test because tiny probability of failing */
  assert(msg->MsgSendTime != 0);
  netDelay = netDelayOf(msg->MsgSender);
  if (netDelay == NULL) {
    if (netDelaysIndex == MAXSPLINES) {
      zwarn("Cannot handle more than %d Splines\n", MAXSPLINES);
      return FALSE;
    }
    netDelays[netDelaysIndex].sender = msg->MsgSender;
    netDelay = &netDelays[netDelaysIndex].delayInfo;
    netDelaysIndex ++;
    netDelay->countReset = 33;
    netDelay->count = 0;
    netDelay->accuracy = MACHINECLOCKRESOLUTION;
    netDelay->min = 1;
    netDelay->ideal = 15;
    netDelay->max = 30;
    netDelay->offset = TDelta(GetT()+5, msg->MsgSendTime);
    netDelay->ave = 5;
  }
  else if (TsynchCount(netDelay)) {
    Tsynch(0, NULL,
           TPlus(msg->MsgSendTime, netDelay->offset),
           netDelay, &correction);
    if (ZTEST(NET, 4) || (ZTEST(NET, 3) && correction!=0))
      zprintf("   Net offset%9ld delay%9ld delayC%9ld\n",
              netDelay->offset, netDelay->ave, correction);
    ZZZZ(NET) netDelay->count = 0;
  }
  shiftTimes(msg, netDelay->offset);
  return TRUE;
}
unsigned long spHostFromName(char *hostname) {
  static unsigned long thishost = 0;
  unsigned long hostnum = 0;
  char hostbuf[200];
  char *hname;
  struct hostent *host;
  if (hostname == NULL || *hostname == '\0') {
    if (thishost != 0) return thishost;
    zero(gethostname(hostbuf, sizeof(hostbuf)));
    hname = hostbuf;
  }
  else {
    hname = hostname;
  }
  if (assert((host = gethostbyname(hname)) != NULL)) {
    hostnum = *((unsigned long *)host->h_addr_list[0]);
    if (hostname == NULL && thishost == 0) thishost = hostnum;
  }
  return hostnum;
}
unsigned long spDisplayHost() {
  extern char *getenv();
```

```
  char *display = getenv("DISPLAY");
  char full[100];
  char *loc;
  if (display ==  NULL) return spHostFromName(NULL);
  strcpy(full, display);
  loc = strchr(full, ':');
  if (loc) {
    *loc = '\0';
  }
  return spHostFromName(full);
}
unsigned long spAudioDisplayHost() {
  extern char *getenv();
  char *display = getenv("AUDIODISPLAY");
  char full[100];
  char *loc;
  if (display ==  NULL) return spDisplayHost();
  strcpy(full, display);
  loc = strchr(full, ':');
  if (loc) {
    *loc = '\0';
  }
  return spHostFromName(full);
}
void printHostName(void * y) {
  struct hostent *host;
  struct in_addr address;
  address.s_addr = htonl(* (unsigned *) y);
  host = gethostbyaddr(&address, sizeof(struct in_addr), AF_INET);
  if (host) {
    printf("%s", host->h_name);
  }
  else {
    printf("%#lx", *(long *)y);
  }
}
```

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. In a communications environment in which there are a number of dynamically changing objects acting as sources of information and a number of computer processes coupled to a network, each of said processes designed to receive information about only some of said objects, wherein each of said objects is associated with a locale and wherein each locale is associated with a different communication address, a number of communication channels, each associated with a different communications address;

a separate channel for supplying said communication addresses; and, a selector coupled to said separate channel for choosing which of said communication channels a process should connect to based upon which objects said process wishes to obtain information about such that a process can select from a number of objects which object it wants to get data about, whereby means are provided to permit processes to ignore data from non-selected objects by not connecting to them.

2. The apparatus of claim 1 wherein said selector includes means for assigning a beacon having a tag field and a communication channel identification field to an object in a locale, said tag field identifying said object, said communication channel identification field identifying the communication channel associated with said locale;

a specialized beacon communication channel coupled to said network;

means for coupling said beacon to said communication channel for the broadcast thereof over said network; and, means at a process for detecting the presence of said beacons and the fields therein on said specialized beacon communication channel and for detecting the locale in which the object having said assigned beacon resides, thereby to locate and obtain information about said object.

3. The system of claim 2, wherein said means for detecting said locales includes means for identifying the communication channel associated with said locale.

4. The system of claim 2, and further including multiple beacon channels and means for determining which beacon channel to use to communicate a given beacon.

5. The system of claim 4, wherein said means for determining which beacon channel to use for a given beacon includes means for computing a many-to-one mapping from said beacon tag fields to said beacon channels.

6. The system of claim 1, wherein said communications environment includes a networked multicast virtual environment system and wherein said selector includes means for ignoring selected locales, and wherein said ignoring means includes means for ignoring non-neighboring locales, thus to minimize computation and local storage at each of said terminal/applications.

7. In a multicast environment including a number of processes coupled to a network in which large scale virtual environments are built with at least one object located in a locale, each of said locales having an associated communication channel, and in which terminal/processes ignore data from selected locales by not connecting and thus not listening to the communication channels associated therewith, thus to minimize computation and local storage, a system for the finding and tracking of objects and associated locales for locales to which a given process is not listening, comprising:

means for assigning a beacon having a tag field and a communication channel identification field to an object in a locale, said tag field identifying said object, and said communication channel identification field identifying the communication channel associated with said locale;

a separate channel; and, means for broadcasting said beacon over said separate channel to the processes coupled thereto, whereby detection of a particular beacon permits selection by a terminal/process of the appropriate communications channel for the object about which information is desired.

* * * * *